United States Patent [19]
Pierson

[11] Patent Number: 6,036,859
[45] Date of Patent: Mar. 14, 2000

[54] FILTER PRESS APPARATUS

[75] Inventor: Henri Gerhard Willem Pierson, Tenerife, Spain

[73] Assignee: D & C Limited, Monrovia, Liberia

[21] Appl. No.: 09/084,434

[22] Filed: May 27, 1998

[30] Foreign Application Priority Data

Jun. 2, 1997 [GB] United Kingdom .................... 9711358

[51] Int. Cl.⁷ .................................................. B01D 29/41
[52] U.S. Cl. .......................... 210/236; 210/346; 210/351; 210/450; 100/197; 100/211
[58] Field of Search ...................... 210/331, 332, 210/346, 350, 351, 224, 230; 100/113, 197–199, 211

[56] References Cited

U.S. PATENT DOCUMENTS

| | | | |
|---|---|---|---|
| 2,988,222 | 6/1961 | Hagdahl | 210/350 |
| 5,482,623 | 1/1996 | Pierson | 210/346 |

FOREIGN PATENT DOCUMENTS

| | | |
|---|---|---|
| 258844A2 | 3/1988 | European Pat. Off. . |
| 907485 | 10/1962 | United Kingdom . |

*Primary Examiner*—Matthew O. Savage
*Attorney, Agent, or Firm*—Dennison, Meserole, Scheiner & Schultz

[57] ABSTRACT

Filter press apparatus comprises a plurality of substantially parallel filter plates assembled as a unit and located within a substantially rigid outer shell to provide a closed vessel to which can be supplied medium under pressure to be filtered via the plates, a substantially impermeable primary membrane lining the shell for forming a substantially incompressible boundary wall to the unit on supply of pressure medium to the space between the primary membrane and the shell, and a secondary membrane having an intermediate extent between the primary membrane and the unit which, with the primary membrane urged towards the unit, moves axially with the unit and slides relative to the primary membrane to eliminate stress in the primary membrane during the compression stage.

6 Claims, 2 Drawing Sheets

FILTER PRESS APPARATUS

BACKGROUND OF THE INVENTION

This invention relates to filter press apparatus, and more particularly to such apparatus comprising a plurality of substantially parallel filter plates assembled as a unit or pack, and housed within a substantially rigid outer shell to constitute a closed pressure vessel, either or both of the unit and the shell being movable relative to the other between a position wherein the unit is sealed within the shell to enable pressurised supply to the shell of medium to be filtered via the plates, and a position wherein the unit is at least partially removed from the shell to enable the discharge of resultant filter cake from between the plates.

UK patent no. 2282977 discloses apparatus of this type and incorporating a cylindrical flexible membrane within the shell which is inflated to urge the membrane against the periphery of the unit to define a substantially incompressible boundary wall thereto for the duration of the filtration operation. When the filtration operation is completed, and it is desired to remove the unit from the shell to enable discharge of the filter cake, the membrane is deflated whereby a gap is formed between the shell/membrane and the unit. Thus the unit can be removed from the shell without interference between the shell and the unit, and the filter cake can be removed from the unit.

After completion of the filtration operation, and prior to removal of the unit from the shell to enable discharge of the filter cake, it is often desirable to be able to compress the unit to squeeze excess moisture from the filter cake.

This is achieved by means of hydraulic rams, inflatable bags or the like which compress the unit axially while the membrane is in contact with the unit.

Such an arrangement works well with units having a relatively small number of filter plates or when used with filter cakes that are not very compressible, in which cases there is little stress on the membrane due to the limited axial movement of the unit.

However, in cases where the cakes are relatively compressible and/or many filter plates are present, the first filter plate of the unit moves a relatively large distance during the compression stage, and, as the membrane is urged against the unit, undue stress can be applied to the material of the membrane which can cause rupture of the membrane.

SUMMARY OF THE INVENTION

It is an object of the invention to provide filter plate apparatus of the described type and which eliminates undue stress being applied to the membrane during compression of the unit.

According to the present invention there is provided filter press apparatus comprising a plurality of substantially parallel filter plates assembled as a unit and located within a substantially rigid outer shell to provide a closed vessel to which can be supplied, under pressure, medium to be filtered via the plates, a substantially impermeable primary membrane lining the shell such that, on supply of a pressure medium to the space between the primary membrane and the shell, the primary membrane is urged towards the unit to define a substantially incompressible boundary wall to the unit fixed for the duration of the filtration operation, and a secondary membrane having an intermediate extent interposed between the primary membrane and the unit of filter plates, the arrangement being such that, with the primary membrane urged towards the unit, and on axial compression of the unit, the intermediate extent of the secondary membrane moves axially with the unit and slides relative to the primary membrane, whereby the primary membrane remains substantially stationary.

It will thus be appreciated that the axial movement of the plates of the unit is accommodated by the secondary membrane, the primary membrane remaining unstressed as the secondary membrane slides within it.

In a preferred embodiment of the invention, the secondary membrane, which is secured within the shell to extend substantially the length thereof, includes a slack extent, conveniently of reflex shape, between the intermediate extent and one fixed end thereof, the length of said slack extent being sufficient to accommodate said movement of the unit of filter plates on compression thereof without inducing stress into the secondary membrane.

Conveniently the space between the secondary membrane and the shell contains a liquid, which may or may not be pressurised.

Compression of the unit of filter plates may be achieved by means of an hydraulic ram the piston of which extends axially into the shell to engage the endmost filter plate, the space between the secondary membrane and the shell containing liquid under pressure which urges the secondary membrane into engagement with the piston to seal said piston within the shell.

DETAILED DESCRIPTION OF THE PREFERRED EMBODIMENT

Figure 1:
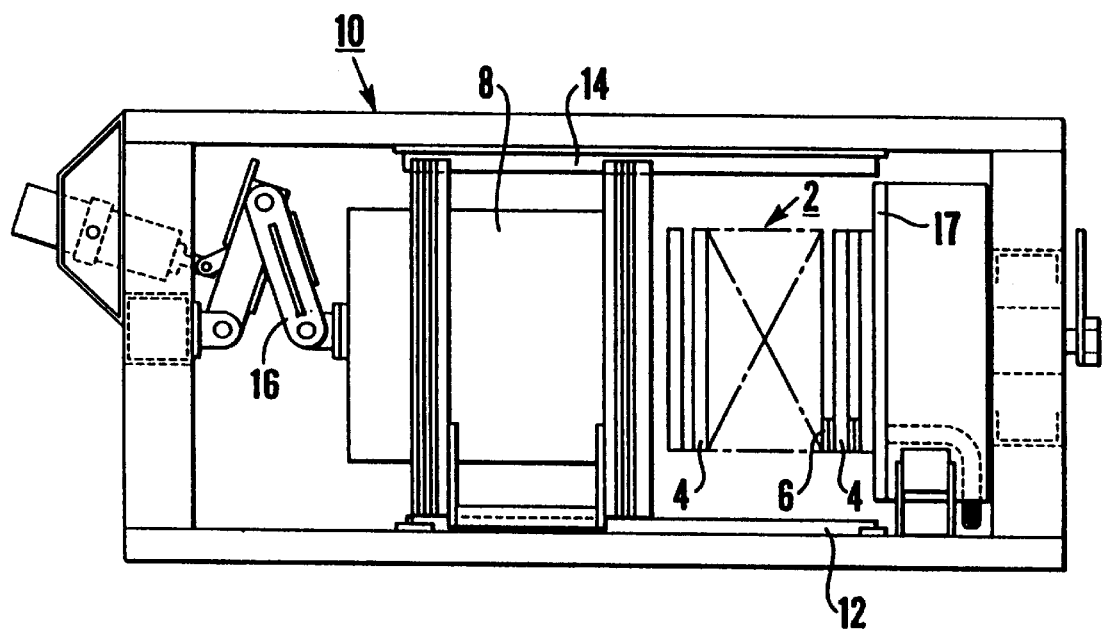
FIG. 1 is a schematic view showing the main components of a known filter press apparatus.

Referring to FIG. 1, the apparatus comprises a filter plate pack or unit indicated generally at 2 and comprising a plurality of substantially parallel, spaced apart filter plates 4 which may or may not have elastically compressible spacers 6 therebetween.

The unit 2 is housed within an outer shell 8 mounted on a support frame 10 and moveable along a pair of lower rails 12 and an upper rail 14. Movement is achieved by way of a hydraulically operated toggle link 16 which acts against the rear of the shell 8 to urge the shell 8 into a closed position enclosing the unit 2, in which position the open end of the shell 8 sealingly engages the backing plate 17 of the unit 2.

Figure 2:
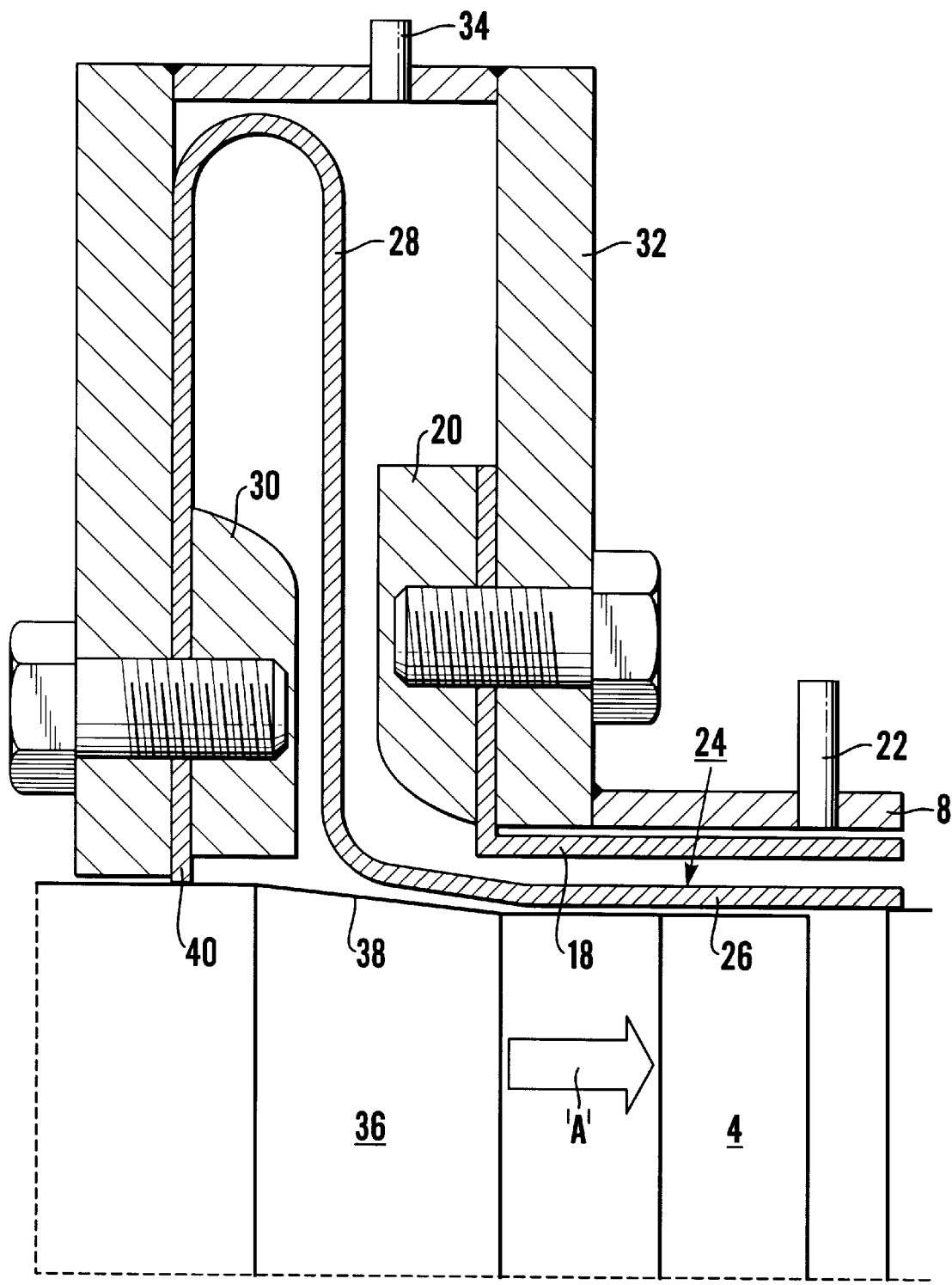
FIG. 2 shows part of a filter press apparatus according to the invention.

Referring to FIG. 2, a generally tubular primary membrane or liner 18 of flexible, substantially impermeable sheet material is secured within the shell 8 to surround the unit 2, the liner 18 being attached to each end of the shell 8 by clamp rings one of which is shown at 20. The inlet port (not shown) to the shell for medium to be filtered extends through the liner 18, while a further inlet port 22 to the shell 8 feeds into the space between the liner 18 and the shell 8 for the ingress of fluid to effect inflation and deflation of the liner 18 in known manner.

A further generally tubular secondary membrane or liner 24 also of flexible, substantially impermeable sheet material is positioned with an intermediate extent 26 thereof between the liner 18 and the unit 2. One end (not shown) of the liner 24 is clamped to the adjacent end of the shell 8, while the other end extent of the liner 24 comprises a slack, reflex portion 28 of generally U-shape in section the free end of which is secured to the end wall of the shell 8 by means of a clamp ring 30.

The reflex portion 28 of the liner 24 is housed within an increased-diameter end chamber 32 of the shell 8 provided with an inlet port 34 for the supply of liquid thereto.

In use of the apparatus, the toggle arm 16 is actuated to slide the shell 8 along the frame 10 until it fully encloses the filter plate unit 2. Unpressurised liquid, typically water or filtrate, is fed into the end chamber 32 through the inlet port 34, while the liner 18 is pressurised by water or other suitable liquid entering the inlet port 22 of the shell 8 to a pressure of, for example, 0.5 bar. This liquid fills the space within the shell 8 surrounding the unit 2 and urges the intermediate extent 26 of the liner 24, by way of the primary liner 18, into engagement with the unit 2 to provide an incompressible, tight-fitting boundary wall to the unit 2 which effectively seals the unit 2 for subsequent filtration under pressure.

Medium to be filtered, generally in the form of a slurry, is then fed under pressure to the unit 2 bounded by the liners 18,24, and filtration takes place in the normal manner until the filtrate has drained away and filter cake is formed between the plates 4.

Once the filtration process has been completed, and in order to remove remaining moisture from the filter cakes before the cakes are themselves removed from the unit 2, the unit 2 is axially compressed.

More particularly, an hydraulically operated, axially moveable compression member 36 extends into the shell 8 to engage the endmost filter plate 4, controlled axial movement of the member 36 serving to compress the unit 2 against the backing plate 17 and to squeeze the filter cakes until they are more or less dry.

On compression of the unit 2, which occurs in the direction of arrow 'A' in FIG. 2, the intermediate extent 26 of the secondary liner 24 moves with the unit 2 in view of its pressurised engagement with the unit 2, this movement being accommodated by the reflex portion 28 of the liner 24 which unfolds in dependence upon the extent of the movement and prevents any undue build-up of stress in the liner 24.

The presence of the liquid in the chamber 32 and between the liners 18 and 24 enables the secondary liner 24 to slide along and relative to the primary liner 18 which therefore remains stationary and unstressed during the compression stage.

Thus the introduction of the secondary liner 24 has effectively overcome the problem of potential rupture of the primary liner 18 present in the current apparatus.

In the event that the line pressure of the mixture to be filtered is sufficient to lift the liners 18,24 from the unit 2 against the pressure of the liquid in the space between the liner 18 and the shell 8 and to cause leakage, it would be desirable to be able to seal the apparatus to overcome such leakage.

This can in fact be readily achieved by pressurising the liquid in the chamber 32 to urge the secondary membrane 24 against the smooth shoulder 38 on the compression member 36 thereby sealing the apparatus against potential leakage.

Conveniently the radially inner face of the clamping ring 30 is spaced slightly outwardly of the surface of the compression member 36, typically by 0.5 mm, the free end of the reflex portion 28 of the secondary liner 24 comprising an annular lip seal 40 which engages the adjacent surface of the compression member 36 to prevent the escape of fluid from the apparatus in the event of failure of the secondary liner 24.

What is claimed is:

1. Filter press apparatus comprising:

a substantially rigid outer shell;

a plurality of substantially parallel filter plates assembled as a unit and locatable within said outer shell to provide a closable filtration vessel;

means for providing to the closable vessel a medium under pressure to be filtered by the filter plates;

a substantially impermeable primary membrane lining the shell and defining a space therebetween;

means for supplying a pressure medium to the space defined between the primary membrane and the shell in order to urge the primary membrane towards the unit to define a substantially incompressible boundary wall to the unit fixed for a filtration operation;

a secondary membrane having an intermediate portion interposed between the primary membrane and the unit of filter plates, said secondary membrane extending adjacent to and surrounding peripheral edges of all filter plates to sealingly cover spaces between adjacent filter plates; and means for axially compressing the unit of filter plates;

whereby upon axial compression of the unit, the intermediate portion of the secondary membrane moves axially with the unit and slides relative to the primary membrane which remains substantially stationary.

2. Filter press apparatus according to claim 1, additionally comprising means for securing a first end of the secondary membrane at one end of the shell, wherein the secondary membrane extends within the shell substantially over a length of the shell and includes a slack portion disposed between the means for securing and the intermediate portion, the slack portion having a length sufficient to accommodate movement of the unit upon axial compression thereof without inducing stress into the secondary membrane.

3. Filter press apparatus according to claim 2, wherein the slack portion is generally U-shaped and is housed in an end chamber of the shell having a greater diameter than other portions of the shell.

4. Filter press apparatus according to claim 1, wherein a space is defined between the secondary membrane and the shell for containing a pressurized liquid.

5. Filter press apparatus according to claim 4, wherein the means for axially compressing comprises a hydraulic ram having a piston which extends axially into the shell to engage an endmost one of said filter plates, the pressurized liquid urging the secondary membrane into engagement with the piston to seal the piston within the shell.

6. Filter press apparatus according to claim 5, wherein the first end of the secondary membrane includes a free portion forming an annular lip seal which engages the piston on its surface.

* * * * *